United States Patent

[11] 3,589,272

| [72] | Inventors | Gabriel Bouladon<br>Versoix-Geneva;<br>Victor Spreter, Geneva, both of,<br>Switzerland |
|------|-----------|---|
| [21] | Appl. No. | 6,253 |
| [22] | Filed | Jan. 27, 1970 |
| [45] | Patented | June 29, 1971 |
| [73] | Assignee | Battelle Memorial Institute<br>Geneva, Switzerland |
| [32] | Priority | Jan. 30, 1969 |
| [33] | | Switzerland |
| [31] | | 1409/69 |

[54] CARTRIDGE FOR QUICKLY PREPARING A HOT BEVERAGE
6 Claims, 6 Drawing Figs.

[52] U.S. Cl. .................................................. 99/295,
99/77.1
[51] Int. Cl. .................................................. A47j 31/14,
A47j 31/24

[50] Field of Search .......................................... 99/295,
77.1, 323, 289, 297, 299, 304, 306

[56] References Cited
UNITED STATES PATENTS

| 3,083,101 | 3/1963 | Noury ........................... | 99/295 |
| 3,199,682 | 8/1965 | Scholtz ......................... | 210/479 |
| 3,389,650 | 6/1968 | Michielsen .................... | 99/295 |
| 3,446,624 | 5/1969 | Luedtke ........................ | 99/77.1 |

*Primary Examiner*—Robert W. Jenkins
*Attorney*—Waters, Roditi, Schwartz and Nissen ABSTRACT: A cartridge for quickly preparing for instance hot coffee by causing water being heated in a first enclosure to burst through a partition into a second enclosure containing ground coffee particles, then through the latter whereupon hot coffee issues through an opening made beforehand in the second enclosure, the coffee particles being held back by a filtering element.

CARTRIDGE FOR QUICKLY PREPARING A HOT BEVERAGE

This invention relates to a cartridge for quickly preparing a hot beverage.

Various devices in the form of cartridges have been proposed for quickly preparing a hot beverage such as coffee. These cartridges generally consist of a compartmented container separately enclosing the liquid and solid ingredients for the preparation of the desired beverage. Upon this container being heated either by means incorporated in the latter or by outside heating means, the compartments that contain the ingredients are made to communicate thereby to cause the latter to come into contact with one another and hence produce the desired beverage. These are, therefore, basically devices for dissolving a quantity of powder in a heated liquid. It has been proposed to use in these cartridges a fusible element adapted to melt when the liquid is heated to a given temperature thereby to cause a soluble powder to come into contact with this liquid. These fusible elements generally contain however toxic substances such as lead and bismuth, the contact of which with the beverage being incompatible with hygiene requirements. Moreover, the cost of these fusible elements is relatively high and they are costly to fit so that they are not really suitable for mass manufacture, this being essential if the price of the cartridges is not to be prohibitive. Also, the welding operation that is needed to fit these fusible elements restricts the choice of materials that can be taken into consideration for the container. Thus, for instance, aluminum is out of the question although it is of particular interest as a packing material both from the point of view of cost and of hygiene. Another drawback of these fusible elements is that they lose their mechanical properties when subjected to pressure, thereby affecting their operation.

The complex construction and high cost of the cartridges that have hitherto been proposed for the preparation of hot beverages have been a major obstacle to their use. Further, the preparation of beverages produced by dissolving a powder does not generally give rise to problems justifying the use of devices specially intended for this purpose. Thus, the actual advantage in using such a cartridge, i.e. the possibility of accurately metering the ingredients beforehand and of storing them separately out of contact with air is of no great interest in the case of beverages to be produced by dissolution.

But the preparation of coffee satisfying the most stringent requirements involves special conditions that are difficult to achieve except with the help of apparatus known as coffee machines. These machines enable the organoleptic principles of coffee to be extracted by causing a given amount of heated water to flow through a set quantity of freshly ground roasted coffee. These machines comprise however a large number of control and adjustment members, thus rendering them complex and costly, and require frequent servicing. That is why the use of these machines has become more widespread in public establishments than in private homes. Also, despite the numerous improvements that have been made to such machines, they generally require a series of manipulations which are messy and not altogether free of danger and which moreover restrict potential output. Moreover, these machines must be connected to a water supply and drainage system, thereby considerably limiting their scope for installation.

An object of the invention is to provide a cartridge for quickly preparing a hot beverage, in particular coffee, which obviates the above-mentioned drawbacks.

According to the present invention there is provided a cartridge for quickly preparing a hot beverage by causing a heated liquid to flow through a particulate product, which comprises at least two enclosures for respectively enclosing predetermined amounts of the liquid and of the particulate product, a first diaphragm separating the enclosures and adapted to be removed to cause them to communicate upon the diaphragm being subjected to a predetermined pressure exerted by the heated liquid, a passage communicating firstly with the enclosure for the particulate product and secondly with the outside of the cartridge, a second diaphragm arranged to close off the passage and intended to be removed when the cartridge is put to use, and at least one permeable partition adapted to retain the solid product in the enclosure which encloses it, while enabling the hot beverage to flow out.

Figure 1:
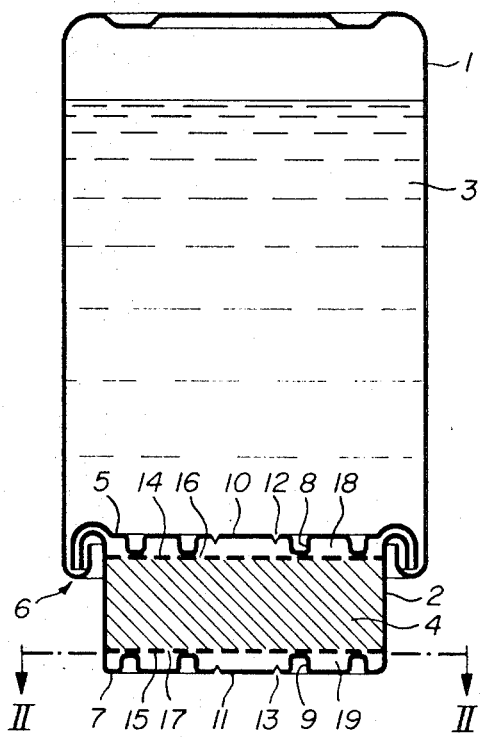
FIG. 1 is a vertical section through a cartridge according to a first form of embodiment of the invention.
Figure 2:
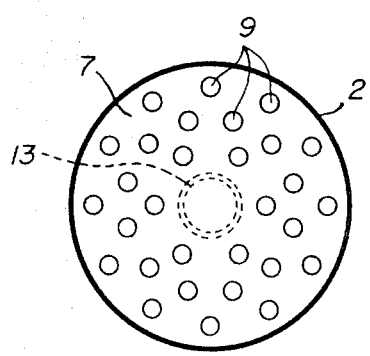
FIG. 2 is a view taken along line II-II of FIG. 1.

The cartridge shown in FIG. 1 comprises two cylindrical containers 1 and 2 respectively containing water 3 and ground coffee 4 in sufficient quantities for preparing a portion of coffee. These containers 1 and 2 are made of pieces of aluminum foil which are assembled together in fluid tight manner, as by crimping, to form a bearing 6. One piece forms the top and sidewalls of container 1, the second piece forms the bottom and sidewalls of container 2 and the third piece forms the bottom of container 1 and at the same time the top wall of container 2. The bottom of container 1, identified as 5, thus forms a partition between containers 1 and 2 and has the same shape as the bottom of the coffee container 2, referenced 7. As may be seen in section in FIG. 1 and in plan in FIG. 2, these bottoms 5 and 7 are formed with bosses 8 and 9, respectively, which project into the coffee container 2 and which are arranged in circular rows around flat circular parts 10 and 11, respectively. These circular parts 10 and 11 form diaphragms that are intended to become detached from the bottoms of which they form part to enable liquid to pass therethrough when the cartridge is put to use. The bottoms 5 and 7 are, to that end, formed with circular incisions 12 and 13 around diaphragms 10 and 11 respectively. The incision 12 is so made as to cause a localized weakening in the thickness of bottom 5 such that the diaphragm 10 will detach itself from bottom 5 when a gauge pressure of 1.1 kg/cm² is exerted on its top side.

This cartridge moreover comprises two apertured discs 14 and 15 which are arranged within the container 2, in contact with the bosses 8 and 9 respectively, and between which the coffee 4 is closely confined. The apertures 16 and 17 in these plates are of smaller size than the ground coffee particles thereby to retain the latter in the container 2, yet allowing liquid to pass therethrough. These discs 14 and 15 are kept by the bosses 8 and 9 a certain distance away from the bottoms 5 and 6, respectively, to form a hot water distribution chamber 18 over the disc 14 and a coffee collecting chamber 19 beneath the disc 15.

The above-described cartridge operates as follows: by pushing in the flat diaphragm-forming part 11 a central opening can be formed in the bottom 7 through which the hot coffee, when made, can flow out. When the cartridge is heated to a temperature of about 103° C. to set up a gauge pressure of 1.1 kg/cm² in the container 1, the central diaphragm 10 is caused to become detached from the bottom by virtue of the presence of the incision 12. The diaphragm 10 is thus forced downwards, leaving a circular opening through which the hot water can pass into the chamber 18 wherein it then flows radially to spread itself over the disc 14. The water then flows through the apertures 16 in disc 14 and flows rapidly downwards through the coffee so as to extract the organoleptic principles therefrom before passing through the lower apertured disc 15. The issuing hot coffee then gathers in the collection chamber 19 then to proceed towards the central outlet opening previously formed by the removal of the diaphragm 11 from the lower bottom 7. The heating action is kept up to maintain sufficient pressure in container 1 for practically all of the water to be discharged therefrom and to flow through the container 2. The thus prepared portion of hot coffee is collected as it flows out of the central outlet opening in bottom 7, for example into a cup placed beneath this opening. It should be noted that at a given temperature the volumetric ratio of the water to air in the water container determines the pressure exerted on the diaphragm. Thus, for a volumetric ratio of water to air of 10:1.7, which is a reasonable ratio, and a temperature of about 103° C, which enables good tasting coffee to be made, use is made of a diaphragm that yields at a gauge pressure of 1.1 kg/cm².

Figure 3:
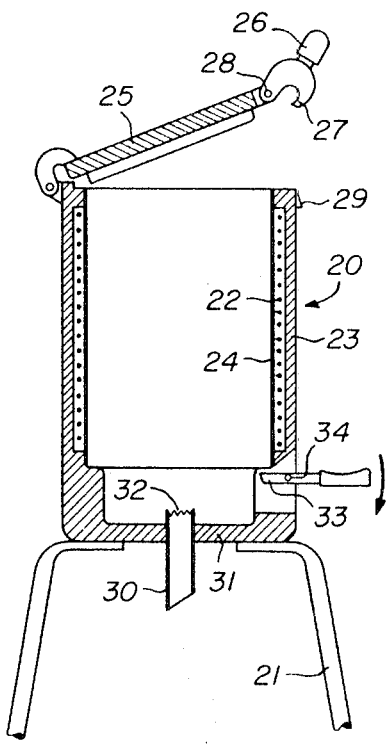
FIG. 3 is a vertical section through an apparatus for facilitating the use of the cartridge shown to FIG. 1.

Specially designed apparatus could be resorted to to heat the cartridge thereby to facilitate its use. Such an apparatus, for preparing coffee with the described cartridge, is diagrammatically shown in vertical section in FIG. 3. It comprises a cylindrical heating receptacle 20 placed upright on a support 21. This receptacle is fitted with an electrical heating element 22 surrounded by an insulating casing 23 and is adapted to the shape of the cartridge whereby the latter may be accommodated in the receptacle 20, in contact with an inner heating wall 24 intended to heat the cartridge by conduction. A lid 25 pivotally mounted on the receptacle 20 serves to close off the top end of the latter. A handle 26, rigid with a latching member 27, is pivotally mounted on a pin 28 secured to the lid 25 so as to cooperate with a catch 29 secured adjacent the top edge of receptacle 20 whereby a cartridge that has been placed in the receptacle can be pressed downwards until it reaches a predetermined vertical position.

This apparatus comprises moreover a tube 30 extending axially through the base 31 of receptacle 20 and having at its upper end a sharp jagged edge 32. This edge 32 is arranged to engage the circular incision 13 in the cartridge bottom 7 when the latter is pressed downwards by the lid 25, and hence to push in the diaphragm 11 to form an outlet opening through which the teeth of this edge 32 can project. The hot coffee issuing from the collection chamber will thus flow past these teeth and into the tube 30 which enables it to collect in a cup placed therebeneath.

The apparatus is also provided with an ejection device 33 for extracting the cartridge once it has been used to prepare the coffee. This device extends through a vertical slot made in the receptacle 20 near the location where the cartridge beading 6 comes to lie. This device 33 is mounted for pivotal movement about a pin 34 secured to the receptacle. Thus, upon lifting the lid 25 after the cartridge has been used, actuation of the device 33 in the direction of the arrow enables the cartridge to be raised by bearing on its beading 6, and to project out of the receptacle 20 for easy manual removal.

The above described apparatus thus enables the cartridge to be used in a particularly simple and speedy manner since it suffices to insert the cartridge into the receptacle, to close the lid, and to switch on the heating for the coffee to be made automatically; the extraction of the cartridge after use is also very simple. Thus with this apparatus coffee can be prepared with a minimum of operations, all of which being moreover very simple. The apparatus may also be provided with a switch for controlling the supply of current to its electric heating element; this switch can be associated, for instance, with the lid of the receptacle whereby the heating may automatically be switched on and off upon the introduction and extraction of a cartridge.

Figure 4:
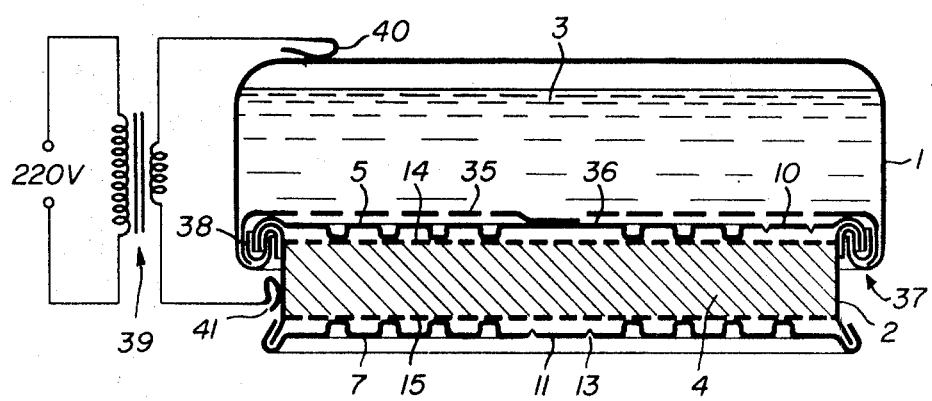
FIG. 4 is a vertical section through a cartridge according to a second form of embodiment of the invention, having built-in heating means.
Figure 5:
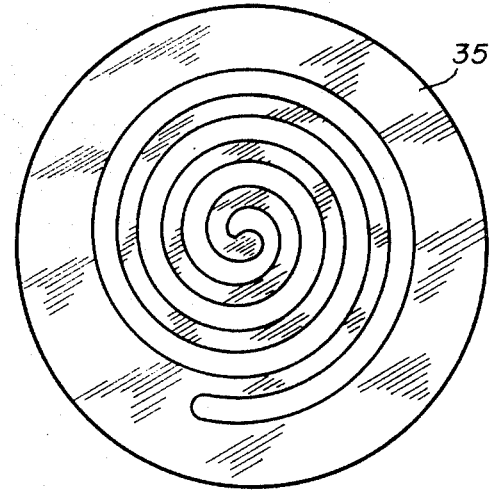
FIG. 5 is a plan view of an electric heating element for the cartridge shown in FIG. 4.

The cartridge shown in FIG. 4 comprises built-in electric heating means enabling it to be connected to a source of current. This cartridge also comprises two containers 1 and 2, respectively containing water and ground coffee, bottoms 5 and 7 and apertured discs 14 and 15. The general structure and function of these components are similar to those of the corresponding components bearing the same reference numerals and described above in relation to the first form of embodiment. The diaphragm 10 that is associated with the bottom 5 is however offset in relation to the vertical axis of the cartridge. The built-in heating means include an electric heating element 35 which is formed from a circular piece of aluminum foil so cut as to form a spiral and which is placed at a short distance above the intermediate bottom 5. This spiral is secured at one end to a flat central portion 36 of the bottom 5 and is held at its other end in a beading 37 formed by crimping the edge portions of the pieces of foil used for the sidewalls of the two containers 1 and 2 and for the intermediate bottom 5. An insulating gasket 38 is disposed in this beading 37 to prevent any electrical connection at that location between the heating element 35, on the one hand, and the bottom 5 and the wall of the lower container 2, on the other hand. This beading 37 ensures fluid tightness and a good contact both between the wall of the upper container 1 and the heating element 35, and between the intermediate bottom 5 and the lower container 2.

The heating element 35 is intended to be connected to a low voltage current source here consisting of a transformer 39 connected to 220 v. mains. Two terminals 40 and 41 connected to the low voltage side of the transformer are provided to ensure electrical contact firstly with the upper container 1 and secondly with the sidewall of the lower container 2. The current thus passes from one terminal to the other via the container 1, the heating element 35, the intermediate bottom 5 and the sidewall of container 2.

This cartridge operates as follows: after pushing in the diaphragm 11, the cartridge is placed over a cup which is to receive the hot coffee from the cartridge, and its heating element 35 is connected to the source. The current flowing through this element 35 quickly heats the water to about 103° C. and produces a gauge pressure of 1.1 kg/cm² in the container 1. As in the preceding case, the diaphragm 10 detaches itself from the bottom 5 at that pressure and the hot coffee is made in similar manner.

Figure 6:
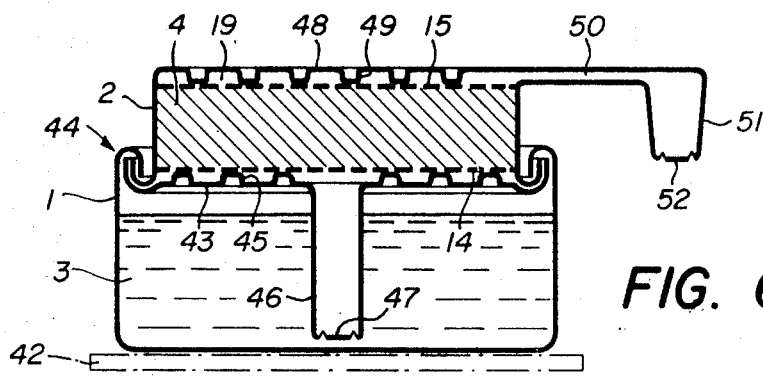
FIG. 6 is a vertical section through a cartridge according to a third form of embodiment of the invention.

In the third form of embodiment illustrated in FIG. 6, the cartridge is meant to be heated from below by any suitable source that is available, e.g. a hot plate 42 shown in broken lines. This cartridge comprises a water container 1 located underneath the coffee container 2. A partition 43 separating containers 1 and 2 is fluidtightly assembled with the latter by crimping to form a bearing 44. This partition 43 is formed with upwardly projecting bosses 45 which are arranged in the same way and have the same function as the bosses 8 in the intermediate bottom 5 of the FIG. 1 cartridge. The partition 43 is solid with a vertical tube 46 which communicates at its upper end with the container 2. This tube 46 extends downwards to near the bottom of container 1 and its lower end is closed off by a diaphragm 47 which is adapted, as with the above described diaphragm 10, to yield at a gauge pressure of 1.1 kg/cm² to enable the heated water to flow through the tube 46.

Apertured discs 14 and 15, similar to those described earlier, serve to retain the ground coffee in the upper container 2. The latter comprises a top wall 48 formed with inwardly projecting bosses 49 and forming, in conjunction with the disc 15, a coffee-collecting chamber 19. A horizontal duct 50 solid with the container 2 enables the hot coffee to be let out sideways, this duct comprising a downwardly turned portion 51 closed off by an opercule-forming diaphragm 52 which is removed by pushing it in when the cartridge is put to use.

To prepare a portion of coffee with this cartridge, the diaphragm 52 is first pushed in to form an outlet opening, whereupon the cartridge is placed on the hot plate 42 and a cup is placed beneath this opening. When the water being heated reaches 103° C. and exerts a gauge pressure of 1.1 kg/cm² on the diaphragm 47, the latter detaches itself from the tube 46 and the heated water rises through the tube, spreads itself over the disc 14 and then rapidly flows through the ground coffee 4 to extract its organoleptic principles, before issuing through the apertured disc 15 into chamber 19 where the hot coffee is collected to be conveyed into the cup via duct 50.

It should be noted that the ground coffee may be stored in the cartridge in an inert atmosphere, such as nitrogen, to prevent it from becoming stale.

It would also be possible to place a given amount of powdered milk or of sugar or of both, in the same compartment as the coffee.

The cartridge may be made of any suitable material either metallic, such as tinplate, or nonmetallic, for example a plastics material able to withstand heat. Instead of the apertured discs, that are placed inside the coffee container, use can also be made of fibrous filtering sheets, e.g. made of paper or of a nonwoven fabric.

We claim:

1. A cartridge for quickly preparing a hot beverage by causing a heated liquid to flow through a particulate product which comprises at least two enclosures for respectively enclosing predetermined amounts of the liquid and of the particulate product, a first diaphragm separating the enclosures and adapted to be removed to cause them to communicate upon the diaphragm being subjected to a predetermined pressure exerted by the heated liquid, a passage communicating firstly with the enclosure for the particulate product and secondly with the outside of the cartridge, a second diaphragm arranged to close off the passage and intended to be removed when the cartridge is put to use, and at least one permeable partition adapted to retain the solid product in the enclosure which encloses it, while enabling the hot beverage to flow out.

2. A cartridge according to claim 1, for the preparation of coffee, wherein said two enclosures respectively contain predetermined quantities of water and of ground coffee and said first diaphragm is adapted to be removed when the pressure in the enclosure containing the water reaches a value of $1.1 \text{ kg/cm}^2$ above atmospheric.

3. A cartridge according to claim 1, further comprising an electrical resistance for heating the water to the desired temperature.

4. A cartridge according to claim 1, further comprising an intermediate partition separating said two enclosures and having an opening closed off by said first diaphragm.

5. A cartridge according to claim 4, further comprising a second partition which is permeable to said liquid and which is placed in the enclosure containing said product, opposite and adjacent said intermediate partition.

6. A cartridge according to claim 5, wherein said intermediate partition comprises portions which project towards the second permeable partition whereby liquid issuing from said opening may spread over the entire area of said second permeable partition.